US000001243H

United States Statutory Invention Registration [19]

[11] Reg. Number: H1243

[43] Published: Oct. 5, 1993

Shimba et al.

[54] SILVER HALIDE COLOR PHOTOGRAPHIC LIGHT-SENSITIVE MATERIAL

[75] Inventors: Satoru Shimba; Keisuke Tobita; Kenji Michiue; Katuya Yabuuchi, all of Hino, Japan

[73] Assignee: Konica Corporation, Hino, Japan

[21] Appl. No.: 848,381

[22] Filed: Mar. 9, 1992

[30] Foreign Application Priority Data

Mar. 12, 1991 [JP] Japan ..... 3-46756

[51] Int. Cl.[5] ..... G03C 1/08

[52] U.S. Cl. ..... 430/508; 430/503

[58] Field of Search ..... 430/508, 503

[56] References Cited

U.S. PATENT DOCUMENTS 4,853,322 8/1989 Makino et al. ..... 430/503

4,956,269 9/1990 Ikeda ..... 430/505

FOREIGN PATENT DOCUMENTS 160449 7/1987 Japan .

*Primary Examiner*—Robert L. Stoll

*Assistant Examiner*—Joseph D. Anthony

*Attorney, Agent, or Firm*—Bierman and Muserlian

[57] ABSTRACT

A silver halide color photoqraphic light-sensitive material having an excellent graininess, sharpness and color reproducibility, particularly of green colors including yellowish qreen and bluish qreen is disclosed. Among silver halide emulsion layers, the blue-sensitive layer is located furthest from a support and the outside thereof, has a non-light-sensitive layer. And the optical specifications of these two layers are as specified in the claims.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC LIGHT-SENSITIVE MATERIAL

FIELD OF THE INVENTION

The present invention relates to a color photographic light-sensitive material, and more particularly to a silver halide color photographic light-sensitive material excellent in the graininess, sharpness and color reproducibility.

BACKGROUND OF THE INVENTION

In recent years, silver halide color photographic light-sensitive material (hereinafter called color light-sensitive material) products have been markedly improved to provide high-quality images; their sharpness and graininess are on a fairly high level and have few or no problems as long as they are appreciated on service-sized color prints or slides available to customers.

However, recently diversified user needs demand commercialization of light-sensitive materials capable of showing excellent characteristics even in specific uses, and from this point of view, the development of light-sensitive materials having still more excellent image-forming characteristics are urgently needed.

To meet the above demand, many studies have hitherto been made to improve silver halide emulsions. For example, U.S. Pat. Nos. 4,414,306, 4,414,310, 4,433,048, 4,434,226 and 4,459,353 disclose techniques for sensitivity improvements including color sensitizing efficiency improvement by use of sensitizing dyes, for sensitivity/-graininess balance improvement, for sharpness improvement and for the use of tabular silver halide grains for covering power improvement.

JP O.P.I. Nos. 113930/1983, 113934/1983 and 113950/1984 also disclose multilayer color light-sensitive materials improved to have a high sensitivity and excellent graininess, sharpness and color reproducibility by using tabular silver halide grains having an aspect ratio of 8:1 in the high-speed emulsion layer thereof.

However, as a result of our investigation, it has been found that the simple use of tabular silver halide grains in the light-sensitive material in the field requiring a very high image quality level as mentioned above is unsatisfactory to attain the required sensitivity, graininess and sharpness.

On the other hand, as for the color reproducibility, one of the four factors of image quality, although color purity is already improved to enable fresh, sometimes stressed color reproduction, the true reproduction of colors that have conventionally been deemed difficult to be reproduced photographically is still not accomplished. For example, those objects in purple/violet or bluish green/yellowish green colors having a red-terminal reflection, i.e., reflecting the light having longer wavelengths than 600 nm, are reproduced in quite different colors than the actual color thereof, thus sometimes disappointing picture takers.

In general, it is important for the true color reproduction in control of the spectral sensitivity distribution to shift the sensitivity of the red-sensitive silver halide emulsion layer (hereinafter called red-sensitive layer) toward shorter wavelength side from the view point of making the peak of the wavelength region to which the light-sensitive material is sensitive closer to the luminosity factor of human beings. Particularly, the red-sensitive layer's sensitivity shift toward shorter wavelength side is important for the color reproduction of objects such as flowers having red-terminal reflection. The sensitivity shift of the red-sensitive layer, however, causes lowering of chroma; particularly has brought trouble to natural skin-color reproduction that is important for the color reproduction in making portraits: i.e.. it loses a healthy reddish color peculiar to the skin to result in a lifeless color.

JP O.P.I. Nos. 20926/1978 and 131937/1979 also disclose techniques for bringing the red-sensitive layer near the green-sensitive layer or shifting the red-sensitive layer's sensitivity to shorter wavelength side, but the effect thereof is not sufficient and has the above-mentioned shortcomings. Further, JP O.P.I. No. 181144/1990 prescribes the difference in the sensitivity to 480 nm between the blue-sensitive layer and the green-sensitive layer and the density of the yellow filter layer.

Also, JP O.P.I. 160449/1987 discloses a technique that specifies spectral sensitivity and interimage effect (IIE). The technique specifies the IIE's orientations to respective color-sensitive layers.

Besides. JP O.P.I. No. 160448/1987 discloses a technique to provide a cyan-sensitive layer to produce an IIE effect upon layers up to the red-sensitive layer to create a negative spectral sensitivity falsely corresponding to the spectral sensitivity of the human eye. To be concrete, it is necessary for generation of IIE to provide an IIE generating layer (cyan-sensitive layer) in addition to the intrinsic blue-sensitive, green-sensitive and red-sensitive layers, so the technique is disadvantageous in that it necessarily increases the amount of silver and production cost, and yet its effect is not sufficient.

Accordingly, there has been a demand for solving the above problem and development of a color light-sensitive material which is satisfactory in the color reproducibility as well as in the graininess and sharpness.

SUMMARY OF THE INVENTION

It is an object of the invention to provide a silver halide color photographic light-sensitive material having excellent graininess, sharpness and color reproducibility, particularly the reproducibility of green colors including yellowish green and bluish green.

DETAILED DESCRIPTION OF THE INVENTION

The above object of the invention is accomplished by a silver halide color photographic light-sensitive material comprising a support having thereon one or more red-sensitive silver halide emulsion layers, one or more green-sensitive silver halide emulsion layers and one or more blue-sensitive silver halide emulsion layers, in which said blue-sensitive silver halide emulsion layer is located furthest from the support and has on the outside thereof at least one non-light-sensitive layer, wherein the parallel transmission density $D_{\lambda 555}$ nm of the unit of said blue-sensitive silver halide emulsion layer and said outside non-light-sensitive layer is equal to or less than 1.05, and the spectral sensitivity distribution $S_{B(\lambda)}$ of said blue-sensitive silver halide emulsion layer satisfies the following conditions:

(A) the wavelength $\lambda_B$max, at which $S_{B(\lambda)}$ becomes maximum. is in the range of 415 nm$\leqq\lambda_B$max$\leqq$470 nm, and (B) $S_{B480}$ nm$\leqq 0.35\times S_B(\lambda_B\text{max})$.

In the invention, the spectral sensitivity distribution is a distribution of the spectral sensitivities obtained as the functions of wavelengths by measuring the sensitivities each defined by the reciprocal of an exposure amount necessary to give a density of the minimum density Dmin+0.7 of the color samples formed by processing after exposing a light-sensitive material to each of monochromatic lights at intervals of several nanometers within the wavelength region range of from 400 to 700 nm.

The present invention is described in detail.

The grain diameter by volume of the silver halide grain used in the blue-sensitive layer of the invention is preferably not more than 0.80 μm, more preferably not more than 0.70 μm and most preferably not more than 0.6 μm from the graininess point of view. The grain diameter by volume herein, in the case of a cubic grain, is the length of a side thereof and, in the case of a noncubic grain, is the length of a side of a cube equivalent in the volume thereto.

The color light-sensitive material of the invention is of a multilayer structure formed by superposing emulsion layers provided for separately recording blue, green and red lights, and at least one of these emulsion layers is preferably comprised of a high-speed sublayer and a low-speed sublayer: particularly, practically useful layer structure examples are as follows:

(1) P1/BH/BL/GH/GL/RH/RL/S,
(2) P1/P2/BH/BL/GH/GL/RH/RL/S,
(3) P1/BH/BL/GH/RH/GL/RL/S,
(4) P1/P2/BH/BL/GH/RH/GL/RL/S,
(5) P1/BH/BM/BL/GH/GM/GL/RH/RM/RL/S,
(6) P1/P2/BH/BM/BL/GH/GM/GL/RH/RM/RL/S,
(7) P1/BH/BL/GH/RH/GM/GL/RM/RL/S,
(8) P1/P2/BH/BL/GH/RH/GM/GL/RM/RL/S, wherein B is a blue-sensitive layer, G is a Green-sensitive layer, R is a red-sensitive layer, H is a highest-speed layer, M is a medium-speed layer, L is a low-speed layer. S is a support and P1 and P2 each are a protective layer, provided that non-light-sensitive layers such as filter layer, intermediate layer, antihalation layer and subbing layer are not shown. The preferred among the above examples are (1), (2), (5) and (6), and more preferred are (2) and (6).

In the invention, P1 or P2 preferably contains a non-light-sensitive silver halide emulsion.

The above non-light-sensitive silver halide emulsion may be of pure silver iodide, silver iodobromide or silver chloroiodobromide, but is of preferably silver halide grains having a silver bromide content of not less than 60%, a silver chloride content of not more than 30% and a silver iodide content of not more than 40%, and more preferably silver iodobromide grains having a silver iodide content of not more than 10%.

The grain size is preferably 0.05 to 0.20 μm for obtaining a high sensitivity with little or no sensitivity drop of the lower layer or sharpness deterioration. The non-light-sensitive silver halide emulsion of the invention is allowed to have a relatively wide grain size distribution, but preferably has a narrow grain size distribution, more preferably the distribution width is within the rang of ±40% of the grain size of the silver halide grains accounting for 90% by weight or number of the whole grains.

The coating weight of silver of the non-light-sensitive emulsion layer is preferably 0.03 to 5 g/m$^2$, more preferably 0.05 to 1 g/m$^2$. As the binder of the non-light-sensitive emulsion layer there may be used any hydrophilic polymers, but is preferably gelatin. The amount of the binder used is preferably not more than 250 g per mol of silver halide.

In the invention, the parallel transmission density of the unit comprised of the blue-sensitive layer and the non-light-sensitive layer unit located on the opposite side of the blue-sensitive layer to the support as shown in the above example (2) P1/P2/BH/BL or example (6) P1/P2/BH/BM/BL can be measured in accordance with the method described in C. R. Berry, J. Opt. Soc. Am, vol. 52, p. 888.

In the invention, the parallel transmission density measured according to such a method is preferably not more than 1.05, more preferably not more than 0.95 and most preferably not more than 0.90 at 555 nm. At the same time, the parallel transmission density obtained by the same method at 630 nm is preferably not more than 1.0, more preferably not more than 0.90.

One of means for achieving the parallel transmission density in the invention is to decrease the coating weight of silver of the blue-sensitive layer and the non-light-sensitive unit, i.e., the parallel transmission density can be adjusted by a combination of the grain diameter and the coating weight of silver of the silver halide emulsion grains used. In the invention, however, the silver content of the blue-sensitive layer is preferably 0.1 to 3.0 g/m$^2$, more preferably 0.2 to 2.0 g/m and most preferably 0.3 to 1.5 g/m$^2$.

Further, it has been found that for the parallel transmission density in the invention, the use of an emulsion of tabular silver halide grains as the emulsion of the blue-sensitive layer is more preferred embodiment.

The emulsion of tabular silver halide grains of the invention is explained.

The aspect ratio of the tabular silver halide grain contained in the silver halide emulsion of the invention (hereinafter may be merely called tabular grain of the invention) is the diameter/thickness ratio of the grain, wherein the diameter of the silver halide grain is the diameter of a circle equivalent in the area to the projection image of the grain, while the thickness is the distance between the two parallel surface planes forming the tabular silver halide grain.

The hexagonal tabular grain of the invention is a grain of which the {111} face is hexagonal and the maximum adjacent side ratio is from 1.0 to 2.0, wherein the maximum adjacent side ratio is the ratio of the longest side to the shortest side forming a hexagon. If the maximum adjacent side ratio of the hexagonal tabular grain of the invention is from 1.0 to 2.0, then the corners of the grain are allowed to be roundish. The length of each side of the hexagon having corners roundish, when the straight portion of each side is extended, is expressed as the distance between the intersecting points of these extended lines of adjacent sides.

Of the sides forming the hexagon of the hexagonal tabular grain of the invention, one half or more are preferably substantially straight lines, and more preferably 4/5 or more are substantially straight lines. In the invention, the adjacent side ratio is preferably from 1.0 to 1.5.

The silver halide emulsion of the invention comprises a dispersion medium and silver halide grains. Preferably not less than 70%, more preferably not less than 80% and most preferably not less than 90% of the number of the silver halide grains in a projection image thereof are hexagonal tabular silver halide grains each having two parallel twin faces. The hexagonal tabular grain of the invention is characterized by having two parallel twin faces, which may be confirmed by a transmission-type-electron-microscopic observation at a low temperature (liquid nitrogen temperature) of a cross-sectionally microtomed flake of a film coated with an emulsion of the above grains.

The coefficient of variation of the grain diameter in the invention represents the degree of variation of grain diameters, expressed in terms of percentage of the quotient of the standard deviation of the diameters of circles equivalent in the area to projection images of hexagonal tabular grains each having a maximum adjacent side ratio of from 1.0 to 2.0 divided by the average grain diameter.

The coefficient of variation of the grain thickness in the invention represents the degree of variation of thicknesses of hexagonal tabular grains of the invention, expressed in terms of percentage of the quotient of the standard deviation of the thicknesses of hexagonal tabular grains each having a maximum adjacent side ratio of from 1.0 to 2.0 divided by the average thickness.

In the invention, the tabular silver halide grains each having an aspect ratio of from 3.0 to 7.0 account for preferably at least 50%, more preferably 70% of the whole projction area of silver halide grains, and the tabular silver halide grains each having an aspect ratio of 3.0 to 4.9 account for preferably 50%, more preferably 70% of the whole projection area of silver halide grains.

In the invention, the silver halide grains each having an even number of twin faces parallel with the principal plane thereof account for at least 70% of the whole projection area of silver halide grains, wherein the principal plane is in the form of a hexagon having a maximum adjacent side ratio of from 1.0 to 2.0, and the silver halide grains having such hexagonal principal planes account for preferably at least 90% of the whole projection area of silver halide grains. And the silver halide grains with hexagonal principal planes having a maximum adjacent side ratio of from 1.0 to 1.5 account for preferably 70%, more preferably 90% of the whole projection area of silver halide grains.

If the hexagonal tabular grains content is low, then the mixing-in rate of other silver halide grains in the different form becomes high. Chemical sensitization is strongly affected by the form, surface characteristics, composition, defects, etc., of silver halide grains, so that if grains different in the form are thus mixedly present, the chemical sensitization degree differs depending on grains, which not only makes it unable to obtain any optimal chemical sensitization conditions with respect to the sensitivity/fog relation but allows the presence as a mixture of insufficiently chemically ripened grains poor in the pressure-desensitization Characteristic and excessively chemically ripened grains poor in the pressure fog, and thus the silver halide grains become poor in the pressure-resistance as a whole.

As the silver halide emulsion of the invention there may be used pure silver bromide or silver iodobromide. The average silver iodide content of the silver iodobromide is preferably not more than 10 mol %, more preferably not more than 8 mol % and most preferably not more than 6 mol % from the color reproducibility point of view. Although pure silver bromide containing less than 0.5 mol % silver iodide is most preferable from the viewpoint of color reproducibility, it is better to contain silver iodide to some extent for the emulsion stability, and an extremely low silver iodide content is undesirable because it forms an extremely contrasty image, so that the optimal range of the silver iodide content is preferably 0.1 to 6 mol %, more preferably 0.5 to 4 mol % and most preferably 1 to 3.5 mol % from the overall point of view.

The silver iodide content of each individual grain can be measured by use of an XMA (X-ray microanalyzer). When the percentage of the standard deviation of the silver iodide content values of individual grains to the average silver iodide content measured according to XMA is defined as a relative standard deviation value (see JP O.P.I. No. 254032/1985), the relative standard deviation value is preferably not more than 20%, more preferably not more than 15% in view of the pressure-resistant characteristic.

The diameter of the hexagonal tabular grain of the invention is preferably not less than 0.4 μm, more preferably 0.5 to 3.0 μm and most preferably 0.5 to 7 [2 m. The average thickness of the tabular grain of the invention is preferably 0.05 to 0.30 μm, more preferably 0.05 to 0.25 μm and most preferably 0.05 to 0.20 μm.

The variation of the grain diameter, as mentioned earlier. is preferably as much small or as much high monodisperse as possible. The emulsion of the invention, however, comprises tabular low-silver-iodide-content grains rapidly developable, so it gives rise to a too contrasty gradation problem, and this problem is further accelerated by making grain diameters mono-disperse.

For this reason, an optimal grain diameter distribution value is selected in the range satisfying both pressure-resistant characteristic and gradation characteristic.

As for the spectral sensitivity distribution of the blue-sensitive layer in the invention, the wavelength $\lambda_B max$ that provides the maximum sensitivity needs to satisfy the condition of 415 nm $\leqq \lambda_B max \leqq$ 470 nm, more preferably 430 nm $\leqq \lambda_B max \leqq$ 470 nm and the sensitivity of the blue-sensitive layer at $\lambda = 480$ nm needs to be not more than 35%, more preferably not more than 25% of the maximum sensitivity value of the blue-sensitive layer.

In order to make the spectral sensitivity distribution of the blue-sensitive layer of the color photographic light-sensitive material of the invention meet the above requirements of the invention, there may be used various means such as, for example, a means to spectrally sensitize an arbitrary silver halide to a desired wavelength region by use of a sensitizing dye having an absorption spectrum in the same region, a means to optimize the halide composition and distribution of silver halide to cause the silver halide to have an intended spectral sensitivity without using any sensitizing dyes, and a means to use an appropriate spectral absorbent in the light-sensitive material to adjust its spectral sensitivity distribution to a desired spectral sensitivity distribution. These means may of course be used in combination.

The following are the examples of the sensitizing dye usable in the blue-sensitive silver halide emulsion layer to obtain the spectral sensitivity distribution in the invention, but are not limited thereto.

SS-1

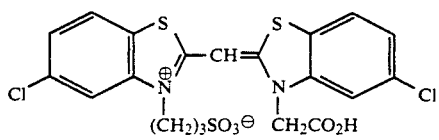

-continued

SS-2

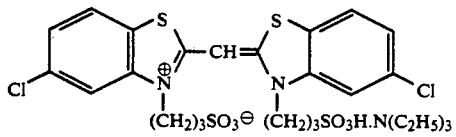

SS-3

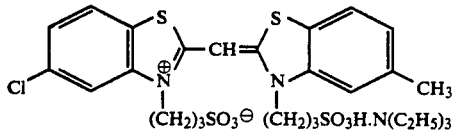

SS-4

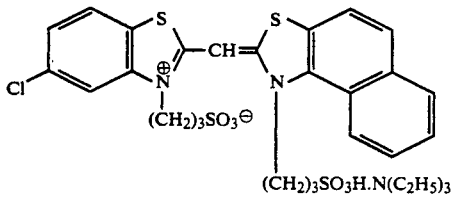

SS-5

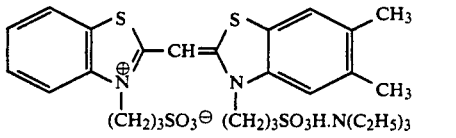

SS-6

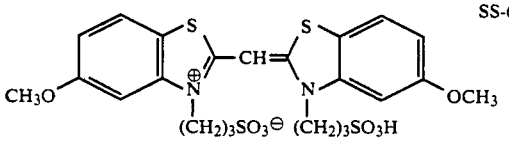

SS-7

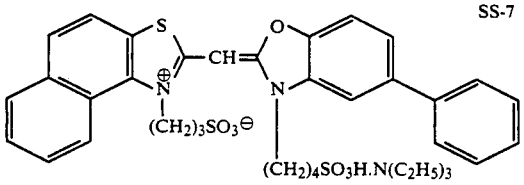

SS-8

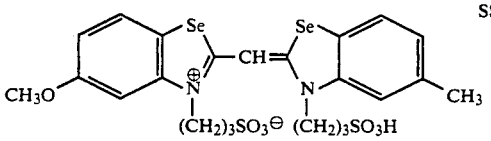

SS-9

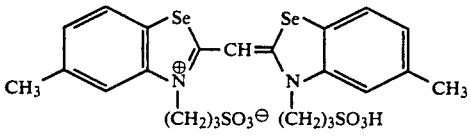

SS-10

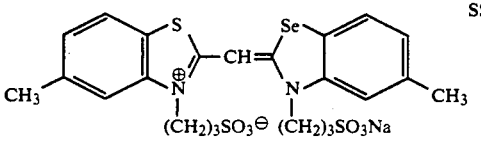

SS-11

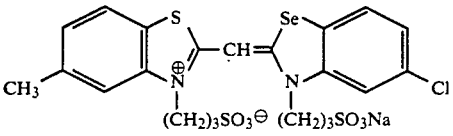

-continued

SS-12

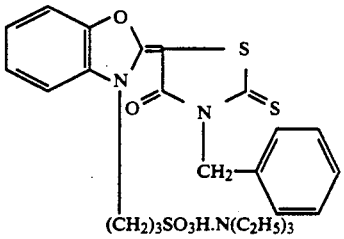

In the invention, it is preferable that the light-sensitive material contain a diffusible DIR compound capable of releasing a diffusible development inhibitor or a precursor thereof upon its reaction with the oxidation product of a developing agent.

Examples of the diffusible DIR compound usable in the invention are described in U.S. Pat. Nos. 4,234,678, 3,227,554, 3,617,291, 3,958,993, 4,149,886 and 3,933,500, JP O.P.I. Nos. 56837/1982 and 13239/1976, U.S. Pat. Nos. 2,072,363 and 2,070,266, Research Disclosure 21228, Dec. 1981.

Particularly preferred examples are the diffusible DIR compounds described in JP O.P.I. No. 110452/1990, pp.485 to 489.

The silver halide emulsion used in the color light-sensitive material of the invention may be chemically sensitized in the usual manner.

To the silver halide emulsion may be added an antifoggant and a stabilizer. As the binder of the emulsion gelatin is advantageously used (but is not limited to it).

The emulsion layer and other hydrophilic layer may be hardened, and may contain a plasticizer and a synthetic polymer dispersion (latex) which is insoluble or hardly soluble in water.

The invention is suitably applicable to light-sensitive materials for photographing use such as color negative films, color reversal films, and the like.

In the emulsion layers of the color light-sensitive material of the invention, known color-forming couplers are generally used.

Further, there may be used arbitrarily colored couplers having a color correction effect, competing couplers, and chemical substances capable of releasing photographically useful fragments such as development accelerator, bleaching accelerator, developing agent, silver halide solvent, toning agent, hardener, fogging agent, antifoggant, chemical sensitizer, spectral sensitizer and desensitizer upon the coupling reaction thereof with the oxidation product of a developing agent.

The light-sensitive material may have auxiliary layers such as a filter layer, an antihalation layer and an antiirradiation layer. These layers and/or emulsion layers may contain a dye which, during processing, is dissolved out of the light-sensitive material or is bleached.

To the light-sensitive material may be added formalin scavenger, brightening agent, matting agent, lubricant, image stabilizer, surfactant, anti-color-stain agent, development accelerator, development retarder and bleaching accelerator.

As the support there may be used discretionarily polyethylene-laminated paper, polyethylene terephthalate film, baryta paper, cellulose triacetate, or the like.

The color light-sensitive material of the invention, to obtain a dye image, is imagewise exposed and then processed according to a generally known color photographic processing method.

EXAMPLES

Examples of the invention are described below, but the embodiment of the invention is not limited by the examples.

Preparation of emulsions

The eight different emulsions shown in the following Table 1 were prepared in accordance with the methods described in JP O.P.I. Nos. 224002/1988 and 5228/2990.

Preparation of seed emulsions

According to the following method, 0.6215 mol of an emulsion of hexagonal tabular seed grains was prepared.

| | |
|---|---|
| Solution $A_1$ | |
| Osein gelatin | 4.26 g |
| Distilled water | 1700 ml |
| Sodium polyisopropylene-polyethyleneoxy-disuccinate, 10% ethanol solution | 0.4 ml |
| Potassium bromide | 1.0 g |
| 10% sulfuric acid | 10.2 ml |
| Solution $B_1$ | |
| Silver nitrate 1.255N aqueous solution | 497 ml |
| Solution $C_1$ | |
| Potassium bromide | 84.6 g |
| Potassium iodide | 7.5 g |
| Distilled water to make | 604 ml |
| Solution $D_1$ | |
| Potassium bromide 1.75N aqueous solution | |

To Solution $A_1$ were added in 2 minutes at 35 ° C. 9.08 ml of each of Solution $B_1$ and Solution $C_1$ according to a double-jet method by using the mixing stirrer described in JP E.P. Nos. 58288/1983 and 58289/1983 to thereby carry out nuclei growth.

After stopping the addition of Solutions $B_1$ and $C_2$, the temperature of Solution $A_1$ was raised spending 30 minutes to 60° C., and again Solutions $B_1$ and $C_1$ were added at a flow rate of 19.5 ml/min for 25 minutes in the double-jet method. In the meantime, the electric potential of silver (measured with a silver ion selection electrode, using a saturated silver-silver chloride electrode as a comparative electrode) was controlled to +6 mV by using Solution $D_1$.

After completion of the addition, pH of the liquid was adjusted with an aqueous 3% potassium hydroxide solution to 6, and an aqueous solution containing 21.3 g of osein gelatin was added thereto to make a seed emulsion EM-0. The prepared seed emulsion EM-0 is of silver halide grains in which the hexagonal tabular grains accounting for 90% or more of the whole projection area thereof were found by electron-microscopic observation to each have a maximum adjacent side ratio of 1.0 to 2.0, an average thickness of 0.07 μm and an average diameter (equivalent to a circle diameter) of 0.5 μm. The emulsion EM-0 in an amount of 0.6215 mol is contained in 4612 ml of the silver halide.

Preparation of tabular-grain emulsion of the invention

The following different solutions were used to prepare a 2.46 mol % AgI-containing tabular silver iodobromide-grain Emulsion EM-1 of the invention.

| | |
|---|---|
| Solution $A_2$ | |
| Seed emulsion EM-O | 0.6215 mol (4612 ml) |
| Solution $B_2$ | |
| 3.50N silver nitrate aqueous solution | 1467 ml |
| Solution $C_2$ | |
| Potassium bromide | 599 g |
| Potassium iodide | 17.0 g |
| Distilled water to make | 1467 ml |
| Solution $D_2$ | |
| 1.75N Potassium bromide aqueous solution | |

At 60° C. the whole quantities of Solutions $B_2$ and $C_2$ were added at a flow rate of 45 ml/min spending 95.14 minutes by a double-jet method to Solution $A_2$ by using the mixing stirrer described in JP E.P. Nos. 58288/1983 and 58289/1983 to thereby grow silver halide grains.

In the meantime, the electric potential of silver was controlled to +28.0 mV by use of Solution $D_2$.

After completion of the addition, the grown grains were washed in the usual sedimentation manner (with use of phenylcarbamoylated gelatin) to remove the excessive salts therefrom, and thereafter an aqueous gelatin solution containing 47.57 g of osein gelatin was added thereto for redispersion by stirring.

Emulsion EM-1 in its amount of 2445 ml contains 5.65 mol of silver halide, and pH and pAg of its emulsion liquid at 40° C. are adjusted to 5.8 and 8.06, respectively.

Approximately 3,000 grains of EM-1 were subjected to electron-microscopic observation/measurement for configuration analysis. As a result, it was found that in EM-1, 50% or more of the whole silver halide grains in the projection area were silver halide gains each having an aspect ratio of not less than 4.34, 70% or more of the whole projection area are tabular grains each having an aspect ratio of not less than 3.86, and 90% or more of the above tabular grains in the whole prejection area are hexagonal tubular grains having a maximum adjacent side ratio of 1.0 to 2.0. The hexagonal tabular grains have an average grain diameter of 0.92 μm (equivalent to circle diameter), a diameter distribution variation coefficient of 21.8%, an average thickness of 0.218 μm, and a thickness variation coefficient of 15%.

Preparation of tabular-grain emulsion of the invention

The following 4 different solutions were used to prepare a 3.18 mol % AgI-containing tabular silver iodobromide-grain Emulsion EM-2.

| | |
|---|---|
| Solution $A_3$ | |
| Seed emulsion EM-O | 1.454 mol (10868 ml) |
| Solution $B_3$ | |
| 3.50N silver nitrate aqueous solution | 944 ml |
| Solution $C_3$ | |
| Potassium bromide | 406 g |
| Potassium iodide | 11.5 g |
| Distilled water to make | 994 ml |
| Solution $D_3$ | |
| 1.75N potassium bromide aqueous solution | |

At 60° C. the whole quantities of Solution $B_3$ and $C_3$ were added at a flow rate of 15.6 ml/min spending 54.52 minutes according to a double-jet method to Solution $A_3$ by used of the mixing stirrer described in JP E.P. Nos. 58288/1983 and 58289/1983 to thereby grow silver halide gains.

In the meantime, the electric potential of silver was controlled to +38.0 mV by use of Solution $D_3$.

After completion of the addition, the grown grains were washed in the usual sedimentation manner (with use of phenylcarbamoylated gelatin) to remove the excessive salts therefrom, and thereafter an aqueous gelatin solution containing 29.3 of osein gelatin was added thereto for redispersion by stirring.

Emulsion EM-2 in its amount of 2660 ml contains 4.94 mol of silver halide grain, and pH and pAg of the emulsion liquid are adjusted at 40° C. to 5.8 and 8.06, respectively.

Approximately 3,000 grains of EM-2 were subjected to electron-microscopic observation/measurement for configuration analysis. As a result, it was found that in EM-2, 50% or more of the whole silver halide grains in the projection area are silver halide grains having an aspect ratio of not less than 4.07, 70% or more of the whole projection area are tabular grains having an aspect ratio of not less than 3.33, and 90% or more of the above tabular grains in the whole projection area are hexagonal tabular grains having a maximum adjacent side ratio of 1.0 to 2.0. The hexagonal tabular grains have an average grain diameter (equivalent to circle diameter) of 0.62 μm, a diameter distribution variation coefficient of 24.2%, coefficient of 9%.

The emulsion samples EM-1 to EM-8 thus prepared in the above manner are summarized in Table 1.

TABLE 1

| Emulsion name | Diameter by volume (μm) | Grain form | Aspect ratio | Average AgI content (%) |
|---|---|---|---|---|
| EM-1 | 0.53 | Tabular grain | 3.86 | 2.46 |
| EM-2 | 0.37 | Tabular grain | 3.33 | 3.18 |
| EM-3 | 0.70 | Tabular grain | 5.12 | 3.70 |
| EM-4 | 0.30 | Tabular grain | 4.01 | 2.30 |
| EM-5 | 0.42 | Cubic grain | 1.00 | 5.25 |
| EM-6 | 0.28 | Cubic grain | 1.00 | 4.00 |
| EM-7 | 0.65 | Cubic grain | 1.00 | 5.50 |
| EM-8 | 0.78 | Cubic grain | 1.00 | 5.50 |

EXAMPLE 1

In the following examples, added amounts of additives to the silver halide photographic light-sensitive material samples are shown in grams per $m^2$ except that silver halide and colloidal silver are in silver equivalent and sensitizing dyes are in moles per mol of the silver halide of the same layer.

The above emulsions were used to prepare coated samples as shown in the following examples.

On a triacetyl cellulose film support were formed the following compositions-having layers in order from the support side, whereby a multilayer color photographic light-sensitive material Sample-101 was prepared.

| | |
|---|---|
| Layer 1: Antihalation layer | |
| Black colloidal silver | 0.18 |
| UV absorbent UV-1 | 0.23 |
| High-boiling solvent Oil-1 | 0.20 |
| Gelatin | 1.46 |
| Layer 2: Intermediate layer | |
| Gelatin | 1.30 |
| Layer 3: Low-speed red-sensitive emulsion layer | |
| Silver iodobromide emulsion EM-6 | 0.80 |
| Sensitizing dye SD-1 | $8.0 \times 10^{-4}$ |
| Sensitizing dye SD-2 | $6.4 \times 10^{-4}$ |

-continued

| | |
|---|---|
| Cyan coupler C-1 | 0.60 |
| Colored cyan coupler CC-1 | 0.10 |
| DIR compound DD-1 | 0.05 |
| DIR compound DD-3 | 0.004 |
| High-boiling solvent Oil-1 | 0.50 |
| Gelatin | 0.90 |
| Layer 4: Intermediate layer | |
| Gelatin | 1.00 |
| Layer 5: High-speed red-sensitive emulsion layer | |
| Silver iodobromide emulsion EM-5 | 1.00 |
| Sensitizing dye SD-1 | $2.5 \times 10^{-4}$ |
| Sensitizing dye SD-2 | $2.0 \times 10^{-4}$ |
| Cyan coupler C-1 | 0.10 |
| Colored cyan coupler CC-1 | 0.01 |
| DIR compound DD-1 | 0.33 |
| DIR compound DD-3 | 0.005 |
| High-boiling solvent Oil-1 | 0.15 |
| Gelatin | 0.90 |
| Layer 6: Intermediate layer | |
| Antistain agent SC-1 | 0.10 |
| High-boiling solvent Oil-2 | 0.10 |
| Gelatin | 1.00 |
| Layer 7: Low-speed green-sensitive emulsion layer | |
| Silver iodobromide emulsion EM-6 | 0.80 |
| Sensitizing dye SD-2 | $8.5 \times 10^{-5}$ |
| Sensitizing dye SD-3 | $8.0 \times 10^{-4}$ |
| Magenta coupler M-1 | 0.53 |
| Colored magenta coupler CM-2 | 0.09 |
| DIR compound DD-2 | 0.005 |
| DIR compound DD-3 | 0.01 |
| High-boiling solvent Oil-2 | 0.70 |
| Gelatin | 1.30 |
| Layer 8: High-speed green-sensitive emulsion layer | |
| Silver iodobromide emulsion EM-5 | 0.90 |
| Sensitizing dye SD-4 | $3.5 \times 10^{-4}$ |
| Sensitizing dye SD-5 | $2.0 \times 10^{-4}$ |
| Magenta coupler M-1 | 0.17 |
| Colored magenta coupler CM-1 | 0.06 |
| DIR compound DD-2 | 0.04 |
| DIR compound DD-3 | 0.004 |
| High-boiling solvent Oil-2 | 0.40 |
| Gelatin | 0.80 |
| Layer 9: Yellow filter layer | |
| Yellow colloidal silver | 0.10 |
| Antistain agent SC-1 | 0.10 |
| High-boiling solvent Oil-2 | 0.10 |
| Gelatin | 1.00 |
| Layer 10: Low-speed blue-sensitive emulsion layer | |
| Silver iodobromide emulsion EM-6 | 0.50 |
| Sensitizing dye SD-6 | $7.0 \times 10^{-4}$ |
| Yellow coupler Y-1 | 0.40 |
| Yellow coupler Y-2 | 0.30 |
| DIR compound DD-1 | 0.01 |
| High-boiling solvent Oil-2 | 0.10 |
| Gelatin | 0.90 |
| Layer 11: High-speed blue-sensitive emulsion layer | |
| Silver iodobromide emulsion EM-5 | 0.65 |
| Sensitizing dye SD-6 | $6.0 \times 10^{-4}$ |
| Yellow coupler Y-1 | 0.20 |
| High-boiling solvent Oil-2 | 0.08 |
| Gelatin | 0.55 |
| Layer 12: First protective layer | |
| Fine-grained silver iodobromide emulsion (average grain diameter: 0.08 μm) | 0.40 |
| UV absorbent UV-1 | 0.07 |
| UV-absorbent UV-2 | 0.10 |
| High-boiling solvent Oil-1 | 0.07 |
| High-boiling solvent Oil-3 | 0.07 |
| Gelatin | 0.60 |
| Layer 13: Second protective layer | |
| Alkali-soluble matting agent (average grain diameter: 2 μm) | 0.15 |
| Polymethyl methacrylate (average particle size: 3 μm) | 0.04 |
| Lubricant WAX-i | 0.04 |
| Gelatin | 0.60 |

C-1
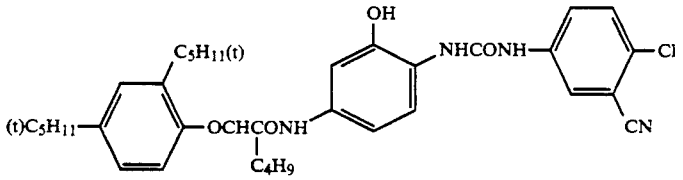
M-1
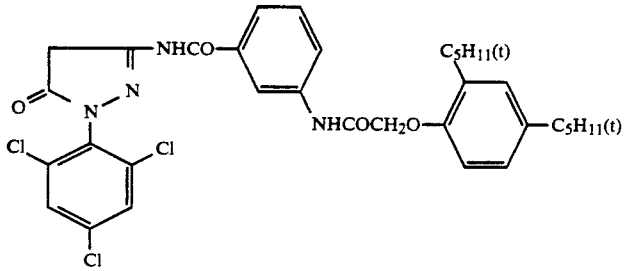
Y-1
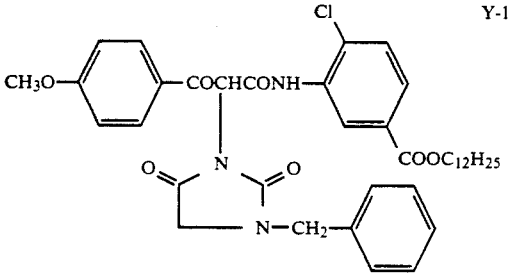
Y-2
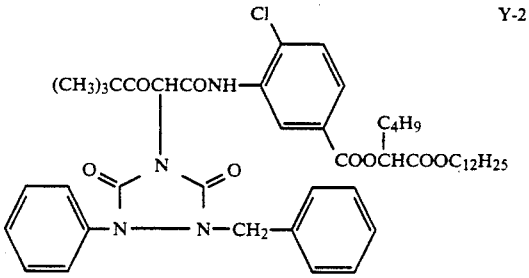
CC-1
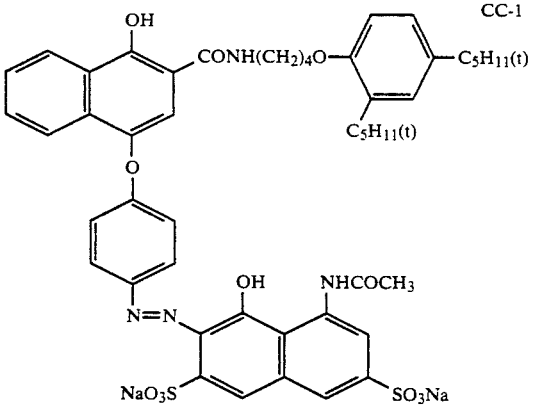
CM-1
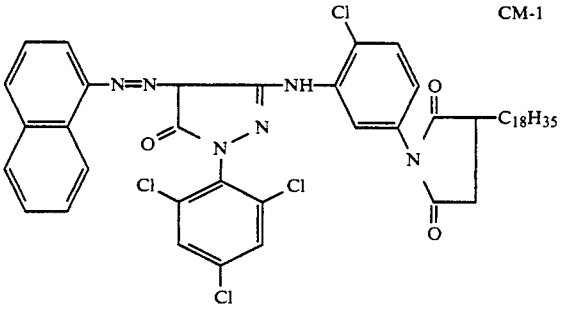
CM-2
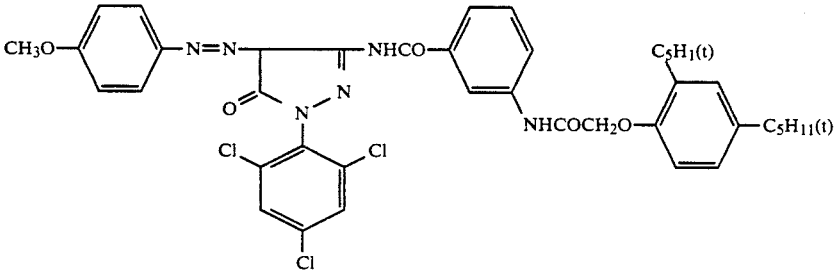

-continued
DD-1
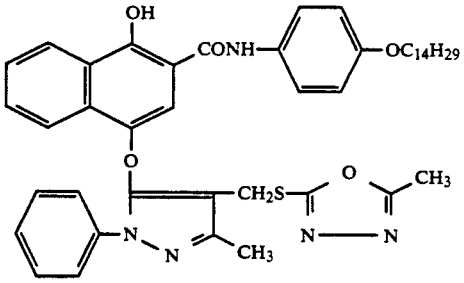
DD-2
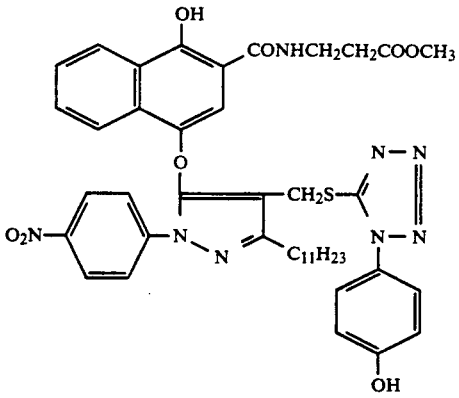
DD-3
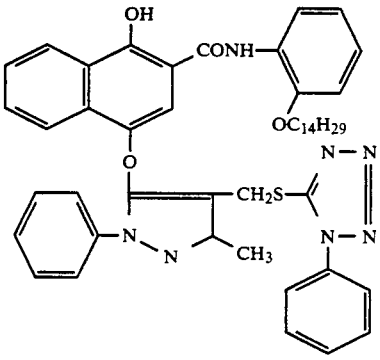
Oil-1
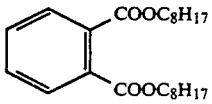
Oil-2
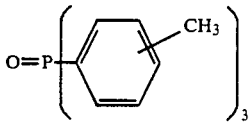
Oil-3
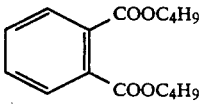
SC-1
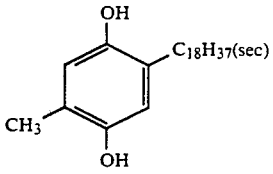
UV-1
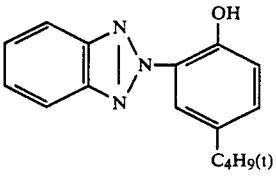
UV-2
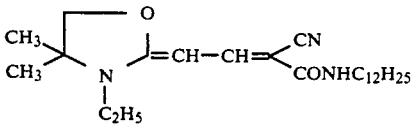
WAX-1
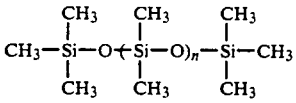
Weight average molecular weight Mw = 3,000
SD-1
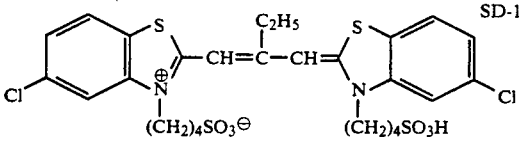
SD-2
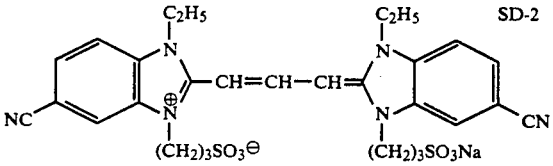
SD-3
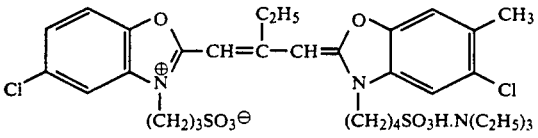

-continued

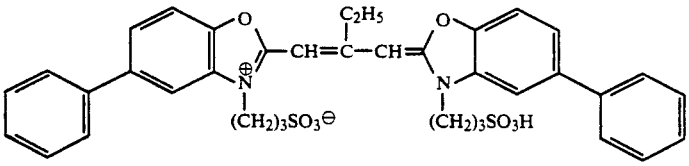

SD-4

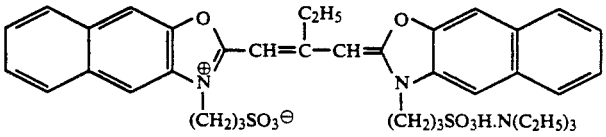

SD-5

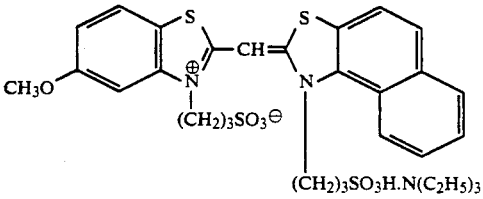

SD-6

Besides the above compounds, there were added coating aid Su-1, dispersing aid Su-2, viscosity adjusting agent, hardeners H-1 and H-2, stabilizer ST-1, antifoggant AF-1 and two different compounds AF-2 having weight average molecular weights of 10,000 and 100,000.

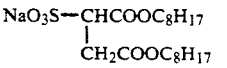

Su-1

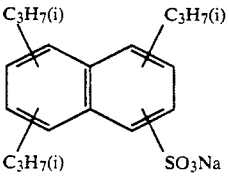

Su-2

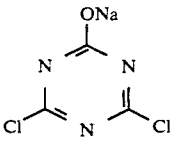

H-1

$(CH_2{=}CHSO_2CH_2)_2O$

H-2

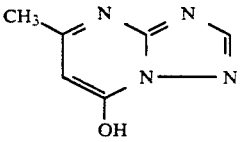

ST-1

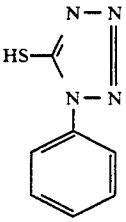

AF-1

-continued

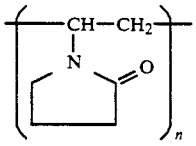

n: polymerization degree

AF-2

Samples-102 to -111 were prepared in the same manner as in Sample-101 except that the sensitizing dye for the blue-sensitive emulsion layer of Sample-101 was changed as shown in Table 2 for optimal chemical sensitization.

Samples-101 to -111 were used to photograph a color rendition chart, manufactured by Macbeth Co., and then processed according to the following color processing steps.

| Processing step (38° C.) | |
|---|---|
| Color developing | 3 min. 10 sec. |
| Bleaching | 6 min. 30 sec. |
| Washing | 3 min. 15 sec. |
| Fixing | 6 min. 30 sec. |
| Washing | 3 min. 15 sec. |
| Stabilizing | 1 min. 30 sec. |
| Drying | |

The compositions of the processing solutions used in the above steps are as follows:

| | |
|---|---|
| Color developer | |
| 4-Amino-3-methyl-N-ethyl-N-(β-hydroxyethyl)-aniline sulfate | 4.75 g |
| Anhydrous sodium sulfite | 4.25 g |
| Hydroxylamine ½ sulfate | 2.0 g |
| Anhydrous potassium carbonate | 37.5 g |
| Sodium bromide | 1.3 g |
| Trisodium nitrilotriacetate, monohydrate | 2.5 g |
| Potassium hydroxide | 1.0 g |
| Water to make 1 liter (pH = 10.1) | |
| Bleaching bath | |
| Ferric ammonium ethylenediaminetetraacetate | 100.0 g |
| Diammonium ethylenediaminetetraacetate | 10.0 g |

-continued

| | |
|---|---|
| Ammonium bromide | 150.0 g |
| Glacial acetic acid | 10.0 ml |
| Water to make 1 liter | |
| Adjust pH to 6.0 with ammonia water. | |
| Fixing bath | |
| Ammonium thiosulfate | 175.0 g |
| Anhydrous sodium sulfite | 8.5 g |
| Sodium metasulfite | 2.3 g |
| Water to make 1 liter | |
| Adjust pH to 6.0 with acetic acid. | |
| Stabilizing bath | |
| Formalin (37% aqueous solution ) | 1.5 ml |
| Koniducks (product of KONICA Corp.) | 7.5 ml |
| Water to make 1 liter. | |

The film of each processes sample was used to make a color paper print (KONICA Color PC Paper Type SR) therefrom so that the photographed gray scale image of an optical density of 0.7 is reproduced in the same density on the print, whereby the reproducibity thereof was evaluated.

As for the spectral sensitivity distribution, from the distribution of minimum density+0.7, comparison of the maximum sensitivity at the minimum density+0.7 in the spectral sensitivity distribution of the blue-sensitive layer (hereinafter referred to as the maximum sensitivity) with the spectral sensitivity at the minimum sensitivity+0.7 to 480 nm (hereinafter referred to as the sensitivity to 480 nm) was performed. The sensitivity comparison is defined by the following formula:

(maximum sensitivity/sensitivity to 480 nm)×100(%)

The λmax(nm) column of Table 2 shows a wavelength which provides the maximum sensitivity in the spectral sensitivity distribution at the minimum density+0.7 of the blue-sensitive layer of each sample.

On the other hand, the parallel transmission density was obtained by measuring with a Hitachi automatic-recording spectrophotometer U-3210 each sample prepared by coating on a triacetyl cellulose film support a unit of Layers 10 to 13 of each of the above multilayer light-sensitive materials. The value obtained by subtracting the uncoated support density from the above parallel transmission density is given as the parallel transmission density of each coated unit in Table 2.

The RMS value is expressed in terms of a 1,000-fold value of the standard deviation of the variation of density values obtained by scanning 1,000 or more sampled densitiy areas to be measured of each light-sensitive material sample with a microdensitometer having a scanning head opening area of 1800 $\mu m^2$ (slit width: 10 μm, slit length: 180 μm) and is shown in a relative value to the value of Sample-101 set at 100.

The results of the above evaluated items are shown in Table 3.

TABLE 3

| Sample No. | Graininess RMS | Sharpness G 40 lines per mm | Sharpness R 25 lines per mm | Color reproducibility Yellow reproducibility | Color reproducibility Green reproducibility |
|---|---|---|---|---|---|
| 101 (Comp.) | 100 | 100% | 100% | D | D |
| 102 (Comp.) | 100 | 100% | 100% | B | C |
| 103 (Comp.) | 150 | 125% | 130% | B | C |
| 104 (Comp.) | 180 | 130% | 135% | C | C |
| 105 (Comp.) | 90 | 150% | 150% | D | D |
| 106 (Inv.) | 80 | 160% | 155% | B | B |
| 107 (Inv.) | 85 | 165% | 160% | B | B |
| 108 (Inv.) | 80 | 165% | 160% | B | B |
| 109 (Inv.) | 85 | 170% | 160% | A | A |
| 110 (Comp.) | 80 | 130% | 135% | C | B |
| 111 (Inv.) | 80 | 170% | 160% | B | A |

A: Excellent
B: Good
C: Poor
D: Bad

As is apparent from Table 3, the graininess, sharpness and true reproducibility of yellow and bluish green colors were attained.

What is claimed is:

1. A silver halide photographic light-sensitive material comprising;

a support having provided thereon a red-sensitive silver halide emulsion layer, a green-sensitive silver halide emulsion layer, and a blue-sensitive silver halide emulsion layer, in which of the light-sensitive silver halide emulsion layers, said blue-sensitive silver halide emulsion layer is located furthest

TABLE 2

| Sample No. | Layer 10 Emulsion | Layer 10 Sensitizing dye | Layer 10 Coated Ag wt ($g/m^2$) | Layer 11 Emulsion | Layer 11 Sensitizing dye | Layer 11 Coated Ag wt ($g/m^2$) | Parallel transmission density $D_{\lambda:550}$ | Parallel transmission density $D_{\lambda:630}$ | Blue-sensitive layer's spectral sensitivity λmax(nm) | Blue-sensitive layer's spectral sensitivity $S_B$ 480 nm / $S_B$ λmax |
|---|---|---|---|---|---|---|---|---|---|---|
| 101 (Comp.) | EM-6 | SD-6 | 0.50 | EM-5 | SD-6 | 0.65 | 1.70 | 1.50 | 435 | 70 |
| 102 (Comp.) | EM-6 | SS-7 | 0.50 | EM-5 | SS-7 | 0.65 | 1.70 | 1.50 | 440 | 50 |
| 103 (Comp.) | EM-6 | SS-7 | 0.50 | EM-7 | SS-7 | 0.65 | 1.27 | 1.15 | 445 | 45 |
| 104 (Comp.) | EM-5 | SS-7 | 0.50 | EM-8 | SS-7 | 0.65 | 1.20 | 1.05 | 445 | 45 |
| 105 (Comp.) | EM-2 | SD-6 | 0.50 | EM-1 | SD-6 | 0.65 | 1.05 | 1.00 | 435 | 75 |
| 106 (Inv.) | EM-2 | SS-7 | 0.50 | EM-1 | SS-7 | 0.65 | 1.05 | 1.00 | 450 | 33 |
| 107 (Inv.) | EM-2 | SS-7 | 0.50 | EM-3 | SS-7 | 0.65 | 0.95 | 0.90 | 450 | 33 |
| 108 (Inv.) | EM-4 | SS-7 | 0.50 | EM-1 | SS-7 | 0.65 | 0.95 | 0.95 | 445 | 30 |
| 109 (Inv.) | EM-2 | SS-7 | 0.50 | EM-1 | SS-7 | 0.50 | 0.90 | 0.90 | 450 | 25 |
| | | | | EM-7 | | 0.15 | | | | |
| 110 (Comp.) | EM-6 | SS-7 | 0.50 | EM-3 | SS-7 | 0.65 | 1.35 | 1.20 | 435 | 30 |
| 111 (Inv.) | EM-2 | SS-4 | 0.50 | EM-1 | SS-4 | 0.50 | 0.90 | 0.90 | 455 | 33 |
| | | | | EM-8 | | 0.15 | | | | |

The improved effect of the sharpness of each sample is given in terms of a dye image's MTF value relative to the MTF value at 50 lines/mm of Sample 101 set at 100.

from said support, said blue-sensitive silver halide emulsion layer having provided on a side thereof furthest from said support, a non-light-sensitive layer, wherein a parallel transmission density $D\lambda_{555}$nm of said blue-sensitive silver halide emulsion layer and said non-light-sensitive layer is equal to or less than 1.05, a spectral sensitivity distribution $S_B(\lambda)$ of said blue-sensitive silver halide emulsion layer satisfies the following conditions:

(a) a wavelength $\lambda_B$max, at which $S_B(\lambda)$ is maximized is within the range of 415 nm$\leqq$80$_B$max$\leqq$470 nm, and (b) $S_{B480}$nm$\leqq$0.35 $S_B(\lambda_B$max), and wherein said blue-sensitive silver halide emulsion layer contains a sensitizing dye of either Formula SS-4 or SS-7

SS-4

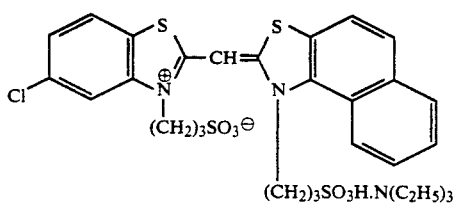

SS-7

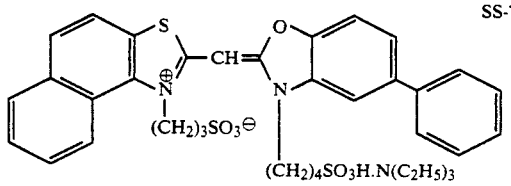

2. The material of claim 1, wherein the condition (b) is $S_{B480}$nm$\leqq$0.25$\times S_B$ ($\lambda_B$max).

3. The material of claim 1, wherein a grain diameter by volume of a silver halide grain used in the blue-sensitive layer is not more than 0.80 μm.

4. The material of claim 3, wherein a grain diameter by volume of the silver halide grain used in the blue-sensitive layer is not more than 0.60 μm.

5. The material of claim 1 wherein said silver halide emulsion of said blue-sensitive silver halide emulsion layer is silver iodobromide and an average silver iodide content of said silver iodobromide is 0.1 to 6.0 mol %.

6. The material of claim 5, wherein the average silver iodide content of silver iodobromide is 1 to 3.5 mol %.

7. The material of claim 1 wherein the silver halide emulsion of said blue-sensitive layer comprises hexagonal tabular grains wherein an average diameter of said hexagonal tabular grains is 0.5 to 3.0 μm, and the average thickness of said tabular grains is 0.5 to 0.30 μm.

8. The material of claim 7, wherein the diameter of the hexagonal tabular grain is 0.5 to 1.7 [m and the thickness of the tabular grain is 0.05 to 0.20 μm.

9. A silver halide photographic light-sensitive material comprising;

a support having provided thereon a plurality of layers in the following order:

P1/P2/BH/BL/GH/GL/RH/RL or

P1/P2/BH/BM/BL/GH/GM/GL/RH/RM/RL wherein B is a blue-sensitive silver halide emulsion layer, G is a green-sensitive silver halide emulsion layer, R is a red-sensitive silver halide emulsion layer, H denotes a high-speed layer, M denotes a medium-speed layer, L denotes a low-speed layer, and P1, and P2 are each a protective layer, said blue-sensitive silver halide emulsion layer being the further light-sensitive emulsion layer from said support, said blue-sensitive silver halide emulsion layer comprising hexagonal tabular grains, each having a number of twin faces parallel with a principal plane thereof accounting for at least 70% of a whole projection area of said silver halide grains, of which a (111) face is hexagonal and has a maximum adjacent side ratio of 1.0 to 2.0, a diameter of 0.5 to 1.7 μm, and a thickness of 0.5 to 0.2 μm, wherein a parallel transmission density $D\lambda_{555}$nm of said blue-sensitive silver halide emulsion layer and the non-light-sensitive protective layer is equal to or less than 1.05, a spectral sensitivity distribution $S_B(\lambda)$ of said blue-sensitive silver halide emulsion layer satisfies the following conditions:

(a) a wavelength $\lambda_B$max, at which $S_B(\lambda)$ is maximized is in the range of 415 nm$\leqq\lambda_B$max$\leqq$470 nm, and (b) $S_{B480}$nm$\leqq$0.25 $S_B(\lambda_B$max); and wherein a silver content of the blue-sensitive layer is 0.3 to 1.5 g/m$^3$, a grain diameter by volume of said silver halide grains used in said blue-sensitive layer is not more than 0.60 μm, and an average silver iodide content of silver iodobromide in said silver halide grains used in said blue-sensitive layer is 1.0 to 3.5 mol %, wherein said blue-sensitive silver halide emulsion layer further contains a sensitizing dye of either Formula SS-4 or SS-7;

* * * * *